Patented Aug. 31, 1926.

1,598,269

UNITED STATES PATENT OFFICE.

RALPH B. DERR, OF FLUSHING, NEW YORK, ASSIGNOR TO GENERAL CHEMICAL COMPANY, OF NEW YORK, N. Y., A CORPORATION OF NEW YORK.

INSECTICIDE.

No Drawing. Application filed March 14, 1925. Serial No. 15,597.

The object of my invention is a mixture of an insecticide with an improved spreader, a comparatively small proportion of which will give to the insecticide suspension, spreading and sticking qualities which are as great as those which would be attained by the use of a very much higher proportion of ordinary spreaders. I have found that a mixture of soap bark and dextrine constitutes a spreader which, when added to insecticides, for instance Bordeaux mixture, lead arsenate, calcium arsenate or zinc arsenite, will dispense with the necessity of adding a much greater proportion of ordinary commercial spreaders, such as casein or calcium caseinate. For instance, I may add to any of these insecticides from 1% to 2% by weight of a mixture of equal weights of soap bark and dextrine, and obtain for such insecticide suspension, spreading and sticking qualities equal to those which would be obtained by adding from 5% to 10% of such commercial spreaders.

The insecticide may be in paste, liquid or powder form, and the spreader, or spreader ingredients, are added to the insecticide by a simple mixing operation, for instance with the aid of a stirrer.

I may employ in the manufacture of my spreader, anywhere from 25% of dextrine and 75% of soap bark, to 75% of dextrine and 25% of soap bark.

I am aware of the fact that both soap bark and dextrine have each, by themselves, been used as a spreader for insecticides. However, the use of the mixture of these two ingredients in the proportions specified, and particularly in equal proportions, has the peculiar advantage of producing, in most cases, if not in all cases, a degree of suspension and spreading which is greater than that which would have been obtained by the use of the same weight of each ingredient by itself. Thus, when I added to 100 parts by weight of lead arsenate, having a suspension index of 18.5, 1% by weight of soap bark, the resulting mixture had a suspension index of 50.3. When I added, instead of soap bark, one part by weight of dextrine, I obtained a suspension index of 44.1. When, however, I added 1% of a mixture of equal parts of soap bark and dextrine, I obtained a suspension index of 51.7. When I added 5% of soap bark, I obtained a suspension index of 67.6, and when I added 5% of dextrine, I obtained a suspension index of 58.6 while when I added 5% of an equal mixture of soap bark and dextrine I obtained a suspension index of 68.5. It will be noted that in each case the suspension produced by the use of dextrine alone was much smaller than the suspension produced by the use of soap bark alone, while when I used half the amount of soap bark in question with half the amount of dextrine, I obtained not only a suspension index much higher than the average but higher than that obtained from the use of soap bark alone.

I calculated my index in each case by adding 1.2 gr. of the substance or mixture in question to 500 cc. of distilled water, at room temperature, contained in a graduated cylinder of 500 cc. capacity, having a diameter of 47–48 millimeters, shaking the cylinder with its contents thoroughly, permitting the suspension to stand for exactly five minute, quickly siphoning off the upper 250 cc. liquid, evaporating such water from the liquid in a tared vessel and then determining the percentage relation which the solid matter in such vessel bore to one-half of the total of 1.2 gr. of substance originally used.

It is of particular interest in this connection that soap bark has, at the present time, a price of more than twice that of dextrine, and that the use of the less expensive dextrine as a substitute for a part of the soap bark, instead of resulting in a mere average index, has resulted in a much larger index. While I have not, in every experiment obtained an increase over the soap bark index, I have, in each case, obtained a higher index than the average of the indices of the two materials used alone.

I am not able at this time to account for the peculiar advantageous results obtained by the use of a mixture of soap bark and dextrine. For practical purposes I prefer to use from 1 to 2 parts of my spreader to 99 to 98 parts of insecticide but I may use as much as 10 parts of spreader. However, with certain insecticides, such as Bordeaux mixture and calcium arsenate, more than 2 parts of casein will give better spreading qualities than more than 2 parts of my spreader; however, the casein is much more expensive than my spreader, so that it would still be more profitable to use my spreader, even in higher proportions.

I have not yet found an insecticide which cannot be spread advantageously by the use of my spreader. If there should be such, I do not intend to include it in my claims.

The following formulas will serve as illustrations of my invention:

I.

| | Per cent. |
|---|---|
| Lead arsenate | 98 |
| Soap bark | 1 |
| Dextrine | 1 |

II.

| | |
|---|---|
| Lead arsenate | 90 |
| Soap bark | 5 |
| Dextrine | 5 |

III.

| | |
|---|---|
| Zinc arsenate | 99 |
| Soap bark | .5 |
| Dextrine | .5 |

IV.

| | |
|---|---|
| Zinc arsenite | 90 |
| Soap bark | 7.5 |
| Dextrine | 2.5 |

V.

| | |
|---|---|
| Bordeaux mixture | 98 |
| Soap bark | 1 |
| Dextrine | 1 |

VI.

| | |
|---|---|
| Lead arsenate | 20 |
| Bordeaux mixture | 79 |
| Soap bark | .5 |
| Dextrine | .5 |

VII.

| | |
|---|---|
| Lead arsenate | 49 |
| Soap bark | .5 |
| Dextrine | .5 |
| Water | 50 |

VIII.

| | Per cent. |
|---|---|
| Sulfur | 98 |
| Soap bark | 1 |
| Dextrine | 1 |

As many insecticides are also fungicides, being applied in the same manner for both purposes, it is obvious that, in so far as my invention is concerned, it makes no difference for what purpose the material is applied. As is well known, the problems connected with the practical use of fungicides are substantially the same as those connected with the application of insecticides, so that a spreader adaptable for use in connection with the one is equally adaptable for use with the other.

It will be understood that what I say about qualities of suspension applies substantially also in the majority of cases to qualities of spreading as the extent to which an insecticide can be suspended in water determines, generally speaking, the extent to which it can spread uniformly on the plant.

Any other bark which may be used in place of soap bark and give equivalent results should be regarded an equivalent of the soap bark.

I claim:

1. In combination with an insecticide, a spreader consisting of soap bark and dextrine.

2. In combination with an insecticide, a spreader consisting of substantially equal proportions of soap bark and dextrine.

3. In combination, from 95-99 parts of insecticide and from 5-1 parts of a mixture of soap bark and dextrine.

RALPH B. DERR.